May 6, 1958 P. H. SPITZ ET AL 2,833,632
APPARATUS FOR THE COMBUSTION OF FLUID COKE
Filed May 27, 1954 2 Sheets-Sheet 1
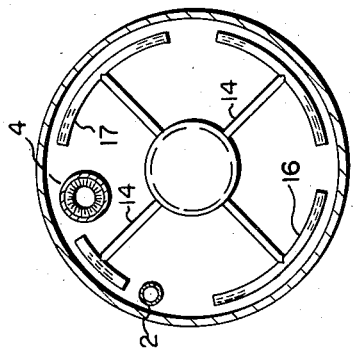
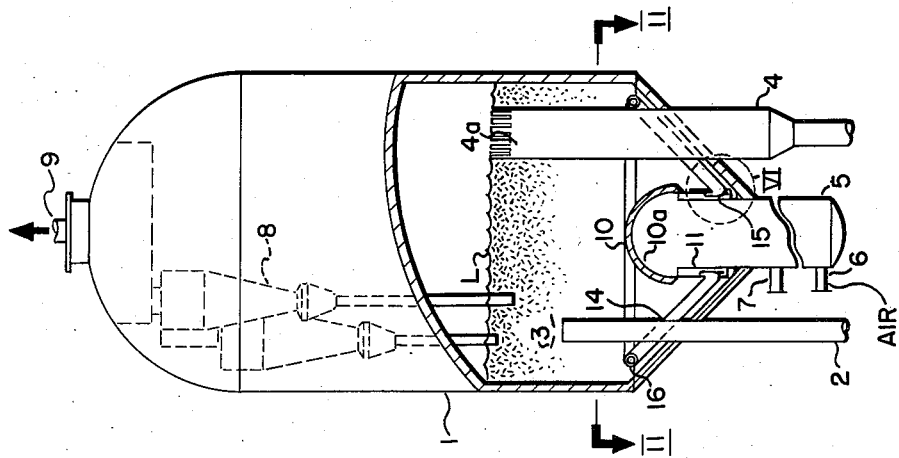
PETER H SPITZ
GERARD P. CANEVARI } INVENTORS
BY *L. Chasan* ATTORNEY

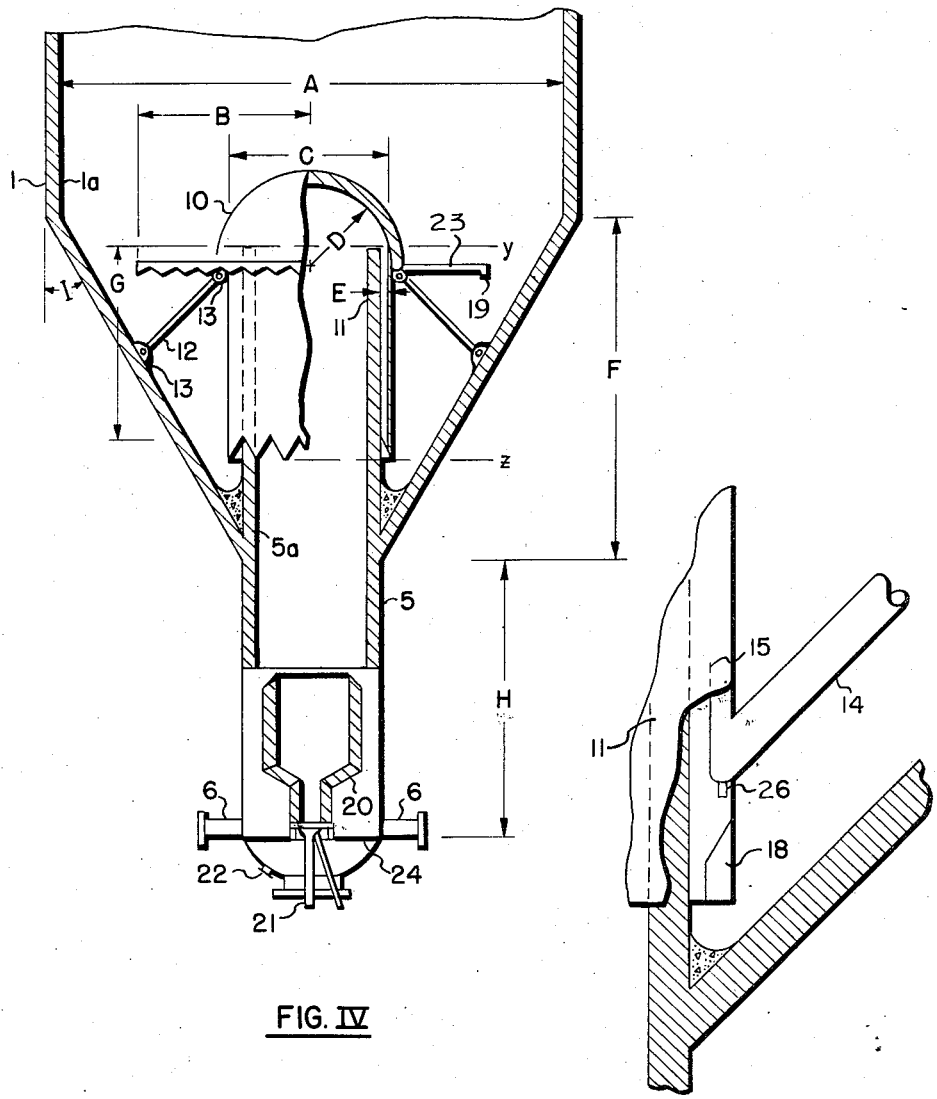
FIG. IV
FIG. III
PETER H. SPITZ
GERARD P. CANEVARI } INVENTORS
BY L. Chasan  ATTORNEY United States Patent Office 2,833,632
Patented May 6, 1958

2,833,632

APPARATUS FOR THE COMBUSTION OF FLUID COKE

Peter H. Spitz, New York, N. Y., and Gerard P. Canevari, Metuchen, N. J., assignors to Esso Research and Engineering Company, a corporation of Delaware Application May 27, 1954, Serial No. 432,859

6 Claims. (Cl. 23—288)

The present invention relates to apparatus for the combusting and heating of particulate carbonaceous solids such as coke produced in a heavy hydrocarbon oil fluid coking process. More particularly, this invention pertains to an improvement of a fluid bed combustion vessel wherein finely divided carbon-containing solids are burned for regenerative and/or heat production purposes. Such regenerative processes include oxidation, reduction, desulfurization, and other special treatments of solids materials. The solids involved may be catalytic or non-catalytic materials which require regeneration for continued use. The invention is, however, more particularly applicable to the supplying of finely divided heat-carrying solid materials such as may be employed in the thermal cracking of heavy hydro-carbonaceous materials, including reduced crudes. Specifically, this invention is concerned with an apparatus for distributing combustion air supplied to a fluidized solids combustion vessel uniformly throughout the fluidized bed.

In a typical fluid catalytic cracking process, the bed of catalyst in the regenerator is kept fluidized by air while undergoing combustion for regenerative purposes and the air is distributed evenly throughout the bed by a grid across the base of the regenerator. The grid consists of a plate with holes or perforations through which the air is directed into the bed.

In the fluid coking of hydrocarbon oils, however, it has been found undesirable to use such a design. Coke from the burner bed, possibly during pressure surges, falls through the grid holes and burns in the oxygen-rich area beneath the grid, resulting in destructively high temperatures. In the regeneration of catalyst, as catalyst normally contains only a few percent of carbon, e. g., about 3%, catalyst falling below the grid does not cause this difficulty of high temperatures as the carbon in the catalyst is soon consumed. In a fluid coking system, however, where the solids undergoing heating are substantially completely carbon, sufficient carbon may be present below a distributing grid to permit the creation of high temperatures.

It is, therefore, an object of the present invention to devise a method and apparatus therefor for supplying to and distributing air within a combustion or burner vessel in a hydrocarbon oil fluid coking system in such a manner as to eliminate the objectionally high temperatures associated with air distributing grids, customarily used in previous fluid bed combustion apparatus.

As the only purpose of a burner vessel in a fluid coking system is to supply the coking reactor heat requirements, the operation of this vessel is relatively simple compared to a cracking catalyst regenerator, i. e., in fluid coke combustion apparatus there does not exist the critical problem of overheating the solids. There is, however, the problem of distributing the air in the dense fluidized bed in such a manner as to eliminate stagnant zones of burning coke which are likely to cause damage to the combustion vessel. Thus, it is a further object of this invention to eliminate in a particulate coke fluid bed combustion vessel, the hazards of the coke burning in oxygen-rich areas or settling out and burning on attendant surfaces.

It is another object of the present invention to provide an apparatus for the combustion of carbon-containing finely divided solids in which the combustion vessel is integrated with a means for supplying heat for initiation of the combustion reaction to take place within the vessel, besides providing for the introduction of a free oxygen-containing gas uniformly throughout the vessel as required for the maintenance of the combustion reaction.

The invention and its objects will be made more clear by reference to the accompanying drawings in which:

Figure I is a diagrammatic view, partly in section, of a combustion or burner vessel such as may be employed according to this invention and shows a preferred air distributing device in the lower portion of the vessel;

Figure II is a horizontal section through a portion of the apparatus according to Figure I along the indicated section lines II—II;

Figure III is an enlarged view of a portion of the apparatus of Figure I, particularly of that portion enclosed by the dotted circle VI;

Figure IV illustrates another variation in the air distributing device suitable for carrying out the objects of this invention and the figure also shows one form of a combustion device suitable for supplying hot gaseous products of combustion to the burner vessel.

In the drawings, like parts have been designated by the same numbers. The numeral 1 designates a combustion vessel such as is employed for the partial combustion and heating of particulate coke in a hydrocarbon oil fluid coking system. The vessel is designed with a conical bottom and is adapted to contain a fluid bed of particulate coke undergoing combustion having an upper level L. In the structure shown, the numeral 2 designates a portion of an inlet conduit system for conveying relatively cool coke from a fluid coking vessel into the vessel 1 at an intermediate point within the fluid bed contained therein. Baffle 3, which may be perforated, disperses the incoming solids throughout the bed. Numeral 4 designates a portion of a conduit system for the withdrawal of the heated coke from vessel 1. Conduit 4, as shown, extends upwardly through the fluidized bed and terminates substantially at the level L at which level the solids materials in the vessels are maintained. The conduit 4 is provided with a notched or slotted inlet portion 4a, whereby the solids are made to overflow more uniformly into the conduit despite slight variations in the fluid bed level. Integrated with the structure of combustion vessel 1 is a means 5 for introducing hot gaseous materials, e. g., products of combustion, as required to initiate the reaction taking place within the vessel, and also for the introduction of air required to maintain the combustion reaction within the combustion vessel. As shown, this means is an auxiliary burner unit of substantially conventional form and is more completely shown in Figure IV. Line 6 admits the required combustion air to the auxiliary burner, which may or may not be diluted, as with steam, for control purposes. As the auxiliary unit is combined with the combustion vessel as a substantially integral part thereof, the need for separate mounting or support means is largely avoided. Also, because of the combination disclosed, the need for extensive conduit connections, including expansion joints is eliminated. Conduit 7 is provided as a safety feature for the introduction of an inert gaseous material in the event of failure of the air supply.

In the upper portion of the vessel, there is a cyclone system 8 adapted to remove and return entrained solids in the combustion gases to the fluid bed. The combustion gases after having the solids removed from them are then transferred from the combustion vessel by line 9 and may be vented or may be subjected to further processing to recover their heat content before being vented. In this particular example, the burner is designed to operate at fluidized gas velocities around 2.5 to 3 ft./sec. and two stages of cyclone recovery are provided. Because of the coarse particle size distribution, as compared to other fluidized solids process, such as catalytic cracking, the entrainment rate will be only approximately 1/5 to 1/8 as great as in a catalytic cracking unit and the equivalent efficiency or a superior efficiency may be expected for this two-stage cyclone system.

Within the fluid bed at the base of the vessel, a deflector or distributing cap member 10 is disposed substantially concentrically over the nozzle end portion 11 of the auxiliary burner extending into the bed. This cap may be suitably lined with refractory material 10a as desired. The cap member is disposed, with reference to the upper end of the nozzle portion, in close vertically spaced relation to provide a sealing zone, defined in the drawing by dotted lines Y and Z (see Figure IV), between the lower edge portion of the cap member and the upper edge portion of the nozzle member. This zone is designed as to prevent pressure surges in the system from forcing coke from the fluid bed into the auxiliary burner. It is preferred to have this zone as deep as may be permitted by the structural form of the elements involved. The lower edge portion of the cap member also is disposed in substantially close relation to the inner surface of the conical bottom of vessel 1, to permit the discharge of gases at that point, so as to prevent stagnation of the coke particles at that point. The velocity of the gases passing through this annulus formed by the cap member and the nozzle member is, preferably, during normal operation, 25 to 60 ft./sec. although the minimum velocity may be as low as 20 ft./sec.

The cap member is, preferably, supported by support elements 12. As shown in Figure IV, the cap member is supported from a conical bottom by means of rigid support elements 12 pivotally connected at each end between paired, spaced lugs 13, attached respectively to the lower surface of the cap member and the upper surface of the conical bottom.

Referring particularly to Figures I and II, a plurality of distributing arms 14, preferably equally spaced, enter into an intermediate portion of the annular passageway formed by the cap member and the nozzle member. A concentric baffle or air scoop 15 directs air or gases into these distributing arms. In this particular design, approximately 50% of the gases in the annulus are directed into 4 arms by means of the air scoop although this proportion may be varied as desired. Small openings 26 are provided at the base of the scoop to permit any solids which may enter the distributing arms to fall to the base of the vessel. Affixed to the upper ends of the distributing arms are perforated or slotted pipes 16 lying substantially in the same horizontal plane and extending a considerable distance, in spaced relationship to the vessel walls, in either direction from the distributing arms. Preferably these pipes are slotted on the underneath side as shown in Figure II by numeral 17. In this design, using air distributing arms, it is preferable to place a restriction ring 18 in the lower portion of the annulus to aid in the proper division of the gases and to maintain the velocity of the gases issuing from the lower portion of the annulus.

In the operation of the apparatus described, as in its embodiment as a heating means for a hydrocarbon oil fluid coking system, the vessel 1 normally will form part of the coke circulation system receiving continuously stripped cool coke from the coking vessel and discharging heated coke thereto. The fluid bed within the combustion vessel is maintained at a sufficient depth to prevent oxygen break through which would be uneconomical and would possibly result in afterburning with consequent damage to the cyclone system. It has been found that there should be a minimum bed height of about 10 ft. to avoid oxygen breakthrough. Tests have shown that at temperatures as low as 1095° F. the oxygen concentration of the flue gases emerging from the bed is less than 0.3% at bed heights of about 10 ft. There is, apparently, no further decrease in this oxygen concentration with increasing bed depth.

In initiating operation of the system, the fuel burner is ignited and a flow of oxygen-containing gas, e. g., air, is introduced by way of conduit 6. The air, heated in the auxiliary burner by combination with flue gases from the combustion chamber, is passed through the vessel 1, heating the vessel. Operation of the burner is continued until the temperature of the fluid bed within the vessel is raised sufficiently to ignite and maintain combustion of the particular coke supplied to the vessel by way of conduit 2. Normally the vessel will operate at a temperature in the range of about 1050 to 1125° F., although the temperature may go as high as 1600° to 1800° F. Coke supplied to the vessel by conduit 2 will normally have a temperature of about 950° F. Once the combustion of the coke has been initiated, it will proceed spontaneously for as long as the oxygen-containing gas is supplied to the vessel in quantities sufficient to support the combustion. Normally, about 0.9 standard cu. ft. of air per lb. of coke circulated to the vessel will be used. As soon as the combustion reaction is underway, the fuel burner 15 may be extinguished and only the flow of the oxygen-containing gases through conduit 6 continued. In some instances, however, where the coke produced by the coking process has greater value than available gases or liquid fuels, the burner may be used to supply heat to the coke particles as such fuels will be burnt in the auxiliary burner in preference to the coke in the combustion vessel.

Referring to Figure IV, the lower portion of the combustion vessel 1 is shown and, as shown, is lined with suitable refractory material 1a. The auxiliary burner 5 projects upwardly into the vessel as previously described and has placed over it a cap member 10 in space relationship thereto. In place of the previously described distributing arms there is used a suitable perforated or slotted horizontal baffle 23 affixed to the cap member. This baffle has a downward extending lip portion 19 in spaced relationship to the vessel walls adapted to aid the distribution of gases around the baffle. The lip portion may be serrated or notched as shown. The lower portion of the cap member 10 is notched or serrated as shown, so as to permit more uniform distribution of the gases issuing from the annulus. The gases upon issuing from the annulus pass upwardly until they are deflected outwardly by the horizontal baffle and are thereby uniformly distributed throughout the base of the fluidized bed. A portion of the gases pass up through the perforations of the baffle and a portion issues from around the edge of the baffle.

With reference to Figure IV, the previously mentioned auxiliary burner will be more particularly described. As shown, the burner consists of a cylindrical casing 5, the upper portion of which may be suitably lined with refractory material 5a. In addition to the refractory liner material 5a, the burner unit is provided internally with a lateral partition 24 disposed at an intermediate level within the casing and in spaced relation to the lower end wall thereof. Supported on the upper surface of the partition 24 is a refractory lined combustion chamber 20 in open communication with the lower end portion of the casing 5. The chamber is disposed substantially concentrically of the casing 5 in radially spaced relation thereto, an annular space or passageway being provided between respective casing walls 20 and 5. A fuel burner element 21 extends through the lower wall into the combustion chamber and is adapted to supply gases or liquid fuel to the burner. Primary air for combustion of fuel supplied to the burner is admitted by conduit connection 22. Secondary air and air for combustion of the carbon-containing particles in the fluid bed is admitted by way of conduit connections 6.

As a specific example, with reference to Figure IV, a vessel may have the following dimensions as indicated on the drawing:

| | |
|---|---|
| A | 11' 9" |
| B | 4' 0" |
| C | 4' 0" |
| D | 2' 0" |
| E | 6" |
| F | 8' 6" |
| G | 5' 0" |
| H | 9' 0" |
| I | 30° |

For a vessel having the above dimensions in which there is contained particulate coke of a size range of about 40 to 500 microns and a true particle density of about 90 lbs./cu. ft., the level of the fluid bed will be about 15 ft. above the serrated edge of the cap member. Using a fluidizing gas velocity of 2.8 ft./sec. the bed will have a fluidized density of about 42 lbs./cu. ft. 17,000 lbs. of coke/hr. at a temperature of 950° F. may be circulated to the combustion vessel of which approximately 23% will be consumed and the remainder may be returned to the coking reactor at a temperature of 1125° F. For such a coke circulation rate, air will be supplied to the combustion vessel through the auxiliary burner at a rate of 8830 S. C. F./min. at a temperature of 300° F. The air then will have a velocity of 35 ft./sec. in the annular passageway.

Variations of this invention will be readily apparent to those skilled in the art. For example, the cap member may be of various shapes other than spherical and may be in various spaced relationships to the nozzle portion of the auxiliary burner and to the vessel walls.

Having described the invention, what is sought to be protected by Letters Patent is succinctly set forth in the following claims.

What is claimed is:

1. Apparatus of the type described for the combusting and heating of carbon containing particles, comprising, in combination, a combustion vessel adapted to contain a fluid bed of carbon-containing particles therein supported by the bottom end wall of said vessel, means extending into said fluid bed for supplying gaseous materials thereto, said means including a vertically disposed, centrally located conduit projecting through and a substantial distance above the bottom end wall of said vessel and opening into said vessel, said conduit being mounted substantially integrally with said bottom end wall, means for supplying a free oxygen-containing gasiform medium to said conduit, a distributing cap enclosing the upper end of said conduit and suspended in said vessel concentrically with said conduit in vertical spaced relation thereto, said cap extending generally vertically downwards just short of the bottom end wall of said vessel, and substantially below the upper end of said conduit in radially spaced relation to said conduit and forming therewith a downwardly opening, elongated, relatively narrow annular passageway for discharging gases directly into said fluid bed while preventing particle flow into said gas conveying conduit, and distributing means exteriorly and integrally supported by said distributing cap and terminating in spaced relation to the shell of said vessel for distributing gases issuing from said annular passageway in a uniform pattern of discharge throughout the lower portion of said fluidized bed.

2. An apparatus according to claim 1 in which said distributing means includes a circular substantially horizontal, perforated baffle affixed to the upper portion of said cap terminating in a downwardly extending uniformly serrated edge whereby a portion of the gases issuing from said annulus and passing upwardly through said bed are directed outwardly toward the shell of said vessel and the remainder of said gases pass through the perforations in said baffle, and in which the peripheral edge portion of said distributing cap is uniformly serrated whereby gases issuing from said annulus are more perfectly distributed around the periphery of said distributing cap.

3. Apparatus according to claim 1 comprising in addition thereto a restriction ring in the lowest portion of said annulus whereby the cross-sectional area of said annulus is substantially reduced.

4. In a system of the type described the combination of a combustion vessel having a conical bottom and adapted to contain a fluid bed of particulate coke, and means for supplying gaseous materials thereto, said means including a conduit centrally and substantially integrally mounted in said conical bottom and extending a substantial distance above the lower end of said conical bottom and terminating in an outlet opening upwardly within said vessel, means for supplying a free oxygen-containing gasiform medium and high temperature products of combustion thereto, a covering member for said outlet suspended in said vessel in spaced relationship thereto and enclosing the upper portion of said conduit, said covering member extending generally vertically downwards just short of the lower end of said conical bottom and substantially below the upper end of said conduit in radial spaced relationship to said conduit thereby forming a downwardly opening, elongated, relatively narrow annular passageway, a plurality of upwardly extending conduit arms symmetrically and exteriorly affixed to said covering member, the lower ends of said conduit arms extending through said covering member to an intermediate portion of said annular passageway, said conduit arms being in spaced relationship to said conical bottom, and a plurality of perforated distributing conduits lying substantially in the same horizontal plane within said fluid bed, affixed to the other ends of said conduit arms and extending a substantial distance in said plane in spaced relationship to the shell of said vessel.

5. The apparatus of claim 4 comprising in addition thereto concentric baffling means located in said annular passageway and integrally mounted interiorly on said covering member adapted to direct a substantial portion of the gases passing through said annular passageway into said conduit arms, and a circular restriction baffle located in the lowermost portion of said annular passageway whereby the cross-sectional area of said annular passageway is substantially reduced at the level of said restriction baffle to insure that the velocity of gases passing past said restriction baffle is above a predetermined minimum.

6. Apparatus of the type described for oxidizing a fluidized mass of carbon-containing solids comprising, in combination, a cone bottom combustion vessel adapted to contain therein a fluidized solids mass, outlet means in the upper portion thereof for removing gaseous products of combustion, a vertically disposed, centrally located, substantially integrally mounted conduit projecting through and a substantial distance above the lower end of the cone bottom of said vessel and opening therein, means for supplying a free oxygen-containing gasiform medium to said conduit, a distributing cap enclosing the upper end of said conduit suspended in said vessel concentrically with said conduit in vertical spaced relation thereto, said cap extending downwardly just short of the lower end of said cone bottom substantially below the upper end of said conduit, and in radially spaced relation to said conduit forming therewith a downwardly opening, elongated, relatively narrow annular passageway leading directly into said fluidized solids mass, the peripheral edge portion of said cap being uniformly serrated, and a circular horizontal perforated baffle exteriorly and integrally affixed to the upper portion of said cap, said baffle terminating in a downwardly extending uniformly serrated edge in spaced relationship to the shell of said vessel.

References Cited in the file of this patent

UNITED STATES PATENTS

| | | |
|---|---|---|
| 1,776,032 | Kobernik | Sept. 16, 1930 |
| 2,147,786 | Fenske | Feb. 21, 1939 |
| 2,662,813 | Packie | Dec. 15, 1953 |